US007546374B2

(12) United States Patent  (10) Patent No.: US 7,546,374 B2
de Kerf  (45) Date of Patent: Jun. 9, 2009

(54) METHODS AND ARRANGEMENTS FOR MANAGING AND MAINTAINING A SWITCH ENVIRONMENT

(75) Inventor: Anthony A. de Kerf, Menlo Park, CA (US)

(73) Assignee: Global Serv Inc., Menlo Park ( * ) Notice: Subject to any disclaimer, the term of this patent is extended or adjusted under 35 U.S.C. 154(b) by 55 days.

(21) Appl. No.: 11/198,030

(22) Filed: Aug. 5, 2005

(65) Prior Publication Data

US 2007/0088840 A1  Apr. 19, 2007

(51) Int. Cl.
*G06F 15/16* (2006.01)
(52) U.S. Cl. .................. 709/230; 709/234; 709/250; 710/62
(58) Field of Classification Search .............. 707/62
See application file for complete search history.

(56) References Cited

U.S. PATENT DOCUMENTS

| | | | |
|---|---|---|---|
| 4,317,050 A | 2/1982 | Wine | |
| 4,345,145 A | 8/1982 | Norwood | |
| 4,454,596 A | 6/1984 | Wunsch et al. | |
| 4,567,913 A | 2/1986 | Klocke | |
| 4,660,203 A | 4/1987 | Hagelstein | |
| 4,885,718 A | 12/1989 | Asprey et al. | |
| 5,109,482 A | 4/1992 | Bohrman | |
| 5,193,200 A | 3/1993 | Asprey et al. | |
| 5,222,228 A | 6/1993 | Asprey | |
| 5,227,666 A | 7/1993 | Asprey | |
| 5,251,125 A | 10/1993 | Karnowski et al. | |
| 5,257,390 A | 10/1993 | Asprey | |
| 5,263,157 A | 11/1993 | Janis | |
| 5,263,158 A | 11/1993 | Janis | |
| 5,263,171 A | 11/1993 | Asprey | |

(Continued)

FOREIGN PATENT DOCUMENTS

CA   2327988   8/2002

(Continued)

OTHER PUBLICATIONS

International (PCT) Search Report mailed Jun. 7, 2007 re PCT/US2006/030387.

(Continued)

*Primary Examiner*—John Follansbee
*Assistant Examiner*—Dhairya A Patel
(74) *Attorney, Agent, or Firm*—IP Strategy Group, P.C.

(57) ABSTRACT

A computer-implemented method of coupling a user interface device (UID) with a system device. The UID and system device are coupled with heterogeneous UID switches. The method includes providing a switch command server (SCS), which is in electronic communication with UID switches. The method also includes receiving at the SCS a switch/location agnostic connectivity indication (SLACI), which indicates a desire to provide a complete data path between the UID and system device. The method further includes performing protocol negotiation, using the SCS and SLACI to ascertain at least one available data path between the UID and system device. The method additionally includes formulating switch commands, which instruct the UID switches to connect the UID and system device to form the complete data path. The method yet further includes transmitting switch commands from the SCS to the UID switches, thereby causing UID switches to connect the UID with the system device.

23 Claims, 13 Drawing Sheets

U.S. PATENT DOCUMENTS

| | | |
|---|---|---|
| 5,268,676 A | 12/1993 | Asprey et al. |
| 5,276,404 A | 1/1994 | Asprey et al. |
| 5,276,901 A | 1/1994 | Howell et al. |
| 5,299,306 A | 3/1994 | Asprey |
| 5,315,633 A | 5/1994 | Champa |
| 5,323,420 A | 6/1994 | Asprey |
| 5,353,409 A | 10/1994 | Asprey et al. |
| 5,365,026 A | 11/1994 | Cromer, Jr. et al. |
| 5,365,194 A | 11/1994 | Sands, Jr. |
| 5,369,566 A | 11/1994 | Pfost et al. |
| 5,373,557 A | 12/1994 | Diehl et al. |
| 5,386,574 A | 1/1995 | Asprey |
| 5,388,032 A | 2/1995 | Gill et al. |
| 5,404,441 A | 4/1995 | Satoyama |
| 5,430,836 A | 7/1995 | Wolf et al. |
| 5,465,105 A | 11/1995 | Shatas et al. |
| 5,504,540 A | 4/1996 | Shatas |
| 5,517,257 A | 5/1996 | Dunn et al. |
| 5,528,283 A | 6/1996 | Burton |
| 5,541,671 A | 7/1996 | Pugel |
| 5,544,299 A | 8/1996 | Wenstrand et al. |
| 5,551,055 A | 8/1996 | Matheny et al. |
| 5,566,339 A | 10/1996 | Perholtz et al. |
| 5,576,723 A | 11/1996 | Asprey |
| 5,579,002 A | 11/1996 | Iggulden et al. |
| 5,587,824 A | 12/1996 | Asprey |
| 5,604,516 A | 2/1997 | Herrod et al. |
| 5,648,824 A | 7/1997 | Dunn et al. |
| 5,650,776 A | 7/1997 | Mitchell et al. |
| 5,687,096 A | 11/1997 | Lappen et al. |
| 5,710,605 A | 1/1998 | Nelson |
| 5,721,842 A | 2/1998 | Beasley et al. |
| 5,729,222 A | 3/1998 | Iggulden et al. |
| 5,732,212 A | 3/1998 | Perholtz et al. |
| 5,742,274 A | 4/1998 | Henry et al. |
| 5,748,261 A | 5/1998 | Pugel |
| 5,801,942 A | 9/1998 | Nixon et al. |
| 5,812,785 A | 9/1998 | Lappen et al. |
| 5,828,376 A | 10/1998 | Solimene et al. |
| 5,844,560 A | 12/1998 | Crutcher et al. |
| 5,870,088 A | 2/1999 | Washington et al. |
| 5,884,096 A | 3/1999 | Beasley et al. |
| 5,926,509 A | 7/1999 | Stewart et al. |
| D412,896 S | 8/1999 | Attwood et al. |
| 5,937,176 A | 8/1999 | Beasley et al. |
| 5,978,389 A | 11/1999 | Chen |
| 6,005,488 A | 12/1999 | Symanow et al. |
| 6,037,936 A | 3/2000 | Ellenby et al. |
| 6,061,759 A | 5/2000 | Guo |
| 6,078,974 A | 6/2000 | Kirshtein |
| 6,104,414 A | 8/2000 | Odryna et al. |
| 6,108,035 A | 8/2000 | Parker et al. |
| 6,112,264 A | 8/2000 | Beasley et al. |
| 6,119,148 A | 9/2000 | Chen |
| 6,127,941 A | 10/2000 | Van Ryzin |
| 6,131,183 A | 10/2000 | Tyler |
| 6,137,455 A | 10/2000 | Duo |
| 6,144,889 A | 11/2000 | Kammler et al. |
| 6,150,997 A | 11/2000 | Asprey |
| 6,185,643 B1 | 2/2001 | Kirshtein et al. |
| 6,208,341 B1 | 3/2001 | Van Ee et al. |
| 6,209,032 B1 | 3/2001 | Dutcher et al. |
| 6,256,014 B1 * | 7/2001 | Thomas et al. .............. 345/163 |
| 6,256,492 B1 | 7/2001 | Bilgic |
| 6,265,951 B1 | 7/2001 | Kirshtein |
| D449,608 S | 10/2001 | Chang |
| 6,297,818 B1 | 10/2001 | Ulrich et al. |
| 6,304,895 B1 | 10/2001 | Schneider et al. |
| 6,307,932 B1 | 10/2001 | Burritt et al. |
| 6,308,146 B1 | 10/2001 | La Cascia, Jr. et al. |
| 6,324,588 B1 | 11/2001 | Desruisseaux et al. |
| 6,324,605 B1 | 11/2001 | Rafferty et al. |
| 6,329,984 B1 | 12/2001 | Boss et al. |
| 6,333,750 B1 | 12/2001 | Odryna et al. |
| 6,345,323 B1 | 2/2002 | Beasley et al. |
| 6,359,636 B1 | 3/2002 | Schindler et al. |
| 6,363,204 B1 | 3/2002 | Johnson et al. |
| 6,377,629 B1 | 4/2002 | Stewart et al. |
| 6,378,009 B1 | 4/2002 | Pinkston, II et al. |
| 6,378,014 B1 | 4/2002 | Shirley |
| 6,388,658 B1 | 5/2002 | Ahern et al. |
| 6,418,494 B1 | 7/2002 | Shatas et al. |
| D463,778 S | 10/2002 | Hsu et al. |
| 6,496,068 B1 | 12/2002 | Eddlemon |
| 6,512,338 B2 | 1/2003 | Cousy |
| 6,522,551 B2 | 2/2003 | Hsu et al. |
| 6,532,512 B1 | 3/2003 | Torii et al. |
| 6,539,418 B2 | 3/2003 | Schneider et al. |
| 6,552,738 B1 | 4/2003 | Lin et al. |
| 6,557,170 B1 * | 4/2003 | Wilder et al. ............... 725/130 |
| 6,567,869 B2 * | 5/2003 | Shirley ....................... 710/62 |
| 6,577,326 B1 | 6/2003 | Heuvelman et al. |
| 6,600,421 B2 | 7/2003 | Freeman |
| 6,609,034 B1 | 8/2003 | Behrens et al. |
| 6,615,272 B1 * | 9/2003 | Ambrose .................... 709/238 |
| 6,618,774 B1 | 9/2003 | Dickens et al. |
| 6,628,344 B1 | 9/2003 | Weber |
| 6,671,756 B1 * | 12/2003 | Thomas et al. ................ 710/73 |
| 6,672,896 B1 | 1/2004 | Li |
| 6,681,250 B1 * | 1/2004 | Thomas et al. .............. 709/226 |
| 6,701,380 B2 | 3/2004 | Schneider et al. |
| 6,708,211 B1 | 3/2004 | Tingley et al. |
| 6,748,473 B1 | 6/2004 | Shirley et al. |
| 6,750,782 B1 | 6/2004 | Byun |
| 6,751,456 B2 | 6/2004 | Bilgic |
| 6,801,944 B2 | 10/2004 | Motoyama et al. |
| 6,802,010 B1 | 10/2004 | Kim et al. |
| 6,807,639 B2 | 10/2004 | Shatas et al. |
| 6,812,938 B2 | 11/2004 | Pinnell |
| 6,823,519 B1 | 11/2004 | Baird et al. |
| 6,842,896 B1 | 1/2005 | Redding et al. |
| 6,880,002 B2 | 4/2005 | Hirschfeld et al. |
| 7,114,018 B1 * | 9/2006 | Maity et al. .................... 710/72 |
| 2001/0039576 A1 | 11/2001 | Kanada |
| 2003/0131127 A1 | 7/2003 | King et al. |
| 2003/0135654 A1 | 7/2003 | Chang |
| 2003/0164816 A1 | 9/2003 | Paetz et al. |
| 2003/0200345 A1 | 10/2003 | Ramsey et al. |
| 2003/0218578 A1 | 11/2003 | Ahern et al. |
| 2004/0015615 A1 | 1/2004 | Liu |
| 2004/0047344 A1 | 3/2004 | Chan et al. |
| 2004/0215617 A1 | 10/2004 | Ramsey et al. |
| 2004/0215742 A1 | 10/2004 | Cook et al. |
| 2004/0215743 A1 | 10/2004 | Cook et al. |
| 2005/0027890 A1 | 2/2005 | Nelson et al. |
| 2005/0165994 A1 | 7/2005 | Dickens |
| 2007/0088840 A1 * | 4/2007 | de Kerf ....................... 709/230 |

FOREIGN PATENT DOCUMENTS

| | | |
|---|---|---|
| CN | 1434383 | 8/2003 |
| JP | 2004220160 A | 8/2004 |

OTHER PUBLICATIONS

Written Opinion mailed Jun. 7, 2007 re PCT/US2006/030387.

"Final Office Action", U.S. Appl. No. 11/322,989; Correspondence Date: Nov. 28, 2007,pp. 17.

"Non-Final Office Action", U.S. Appl. No. 11/322,989; Correspondence Date: Apr. 4, 2008, 18.

"Non-Final Office Action", U.S. Appl. No. 11/196,513; Correspondence Date: Apr. 14, 2008, pp. 34.

"International Preliminary Report on Patentability", Issued in PCT Application No. PCT/US2006/030387; Mailing Date: Feb. 14, 2008.

International (PCT) Search Report mailed Jun. 7, 2007 re APCT/US2006/030387.
Written Opinion mailed Jun. 7, 2007 re. PCT/US2006/030387.
Network Technologies Inc., "Keemux~Px PS/2 KVM Switch Installation and Operation Manual," Jun. 25, 2004; pp. 1-29.
Rose Electronics., "Single user KVM Switch with Dual or Quad Video" (2004), pp. 1-2.
U.S. Appl. No. 11/322,989, filed Dec. 30, 2005; Inventors: Anthony A. De Kerf.
U.S. Appl. No. 11/198,513, filed Aug. 5, 2005; Inventors: Anthony A. De Kerf.
"Non-final Office Action"; U.S. Appl. No. 11/322,989; Mail Date: May 17, 2007; 16 pages.
"Non-final Office Action"; U.S. Appl. No. 11/198,513; Mail Date: Jan. 14, 2008; 34 pages.
"International Search Report (PCT)"; PCT/US2006/030388; Mail Date: May 24, 2007; 4 pages.
"Written Opinion"; PCT/US2006/030388; Mail Date: May 24, 2007; 4 pages.
"Final Office Action"; U.S. Appl. No. 11/198,513; Mail Date: Aug. 11, 2008; 34 pages.
Network Technologies Inc., "KEEMUX-Px PS/2 KVM Switch Installation and Operation Manual," Jun. 25, 2004; pp. 1-29.
Rose Electronics., "Single user KVM Switch with Dual or Quad Video" (2004), pp. 1-2.
Cybex Computer Products Corporation., "XP 4000 Series Installer/User Guide." pp. 1-157.
U.S. Appl. No. 11/322,989; Filed on Dec. 30, 2005; Inventors: Anthony A. De Kerf.
U.S. Appl. No. 11/198,513; Filed on Aug. 5, 2005; Inventors: Anthony A. De Kerf.
"Final Office Action", U.S. Appl. No. 11/322,989; Correspondence Date: Nov. 28, 2007, pp. 17.
"Non-Final Office Action", U.S. Appl. No. 11/322,989; Correspondence Date: Apr. 4, 2008, 18.
"Non-Final Office Action", U.S. Appl. No. 11/198,513; Correspondence Date: Apr. 14, 2008, pp. 34.
"Belkin Corporation", "2-Port KVM Switch with Built-In Cabling" User Manual, FIDK102U, pp. 18.
"Belkin Corporation", "2-Port KVM Switch with Built-In Cabling" User Manual, F1DK102P, pp. 21.

* cited by examiner

METHODS AND ARRANGEMENTS FOR MANAGING AND MAINTAINING A SWITCH ENVIRONMENT

BACKGROUND OF THE INVENTION

Progress in technology combined with lowering cost have proliferated the usage of multiple system devices by a single user. Modern society's want for increased efficiency has resulted in the development of a keyboard, video monitor, and mouse (KVM) switch that enables the user to control a plurality of system devices (e.g., computers, servers, power supply units, etc.) from a singular location.

In an example, a user has two computers, which the user wants to control through a single console (i.e., a keyboard, video monitor, and/or mouse). The user is able to operate either computer by connecting the console and the two computers to the KVM switch.

Similarly, KVM switches may be employed in an enterprise environment. Consider the situation wherein, for example, a company with several departments. Each department may have servers from which one or more users may need access. To enable these servers to be shared among a plurality of users, KVM switches may be implemented. To facilitate discussion, FIG. 1 shows a company with three departments (100, 102, and 104). Each department may have a plurality of users (100a, 102a, and 104a, respectively) who may need access to a plurality of servers (100b, 102b, and 104b, respectively). By employing KVM switches (100c, 102c, and 104c, respectively), a user may be able to access each server from his console.

The aforementioned example (i.e., FIG. 1) is a simple enterprise example; however, KVM switches are typically used in a data center environment wherein thousands of servers may be interconnected. To connect the servers, a plurality of KVM switches may have to be daisy-chained together to form a network. Generally, a KVM switch may support 2 to 64 input ports; thus, the number of KVM switches may depend upon the number of ports supported by a KVM switch.

KVM switches may be managed by three main methods: pressing a button on the KVM switch, using keyboard commands, and assessing on-screen displays (OSDs). In the first method, a user has to manually press a button on the KVM switch to access a server. Although this method may be feasible in simple server or desktop environments, this method is highly inefficient in a larger enterprise environment, such as a data center, where servers may occupy a building the size of a football stadium.

In the second method, keyboard commands (e.g., pressing function keys, an escape key, an enter key, etc.) may be utilized to control KVM switches. The user may enter separate keyboard commands to initialize a KVM switch and to connect to a server. To establish a data path connectivity to the server, the user may have the repetitive task of continually entering keyboard commands in order to move from one KVM switch/server to another. As discussed herein, data path connectivity refers to the process of establishing a connection from a console to a server through one or more KVM switches. The user may find this method tedious if a large number of KVM switches are interposed between the user's console and the target server. The repetitive task of manually entering the keyboard commands may be time-consuming and prone to human errors.

In the third method, KVM switches may be accessible through an on-screen display (OSD), which is a DOS-like screen listing the servers connected to the KVM switch. The user may enter separate keyboard commands to initialize the KVM switch and to activate the OSD. Since the OSD may limit the server names displayed, a user may either have to page-down or type in a server name to select and connect to the server. If multiple KVM switches are interposed between the user's console and the target server, the user may have the onerous task of repeating this process until the user is connected to the target server. Similar to the second method, this task may be time-consuming and prone to human errors.

If a user operates within a homogeneous switch environment, the disadvantages in the aforementioned methods of managing KVM switches may be alleviated wherein the task of establishing the data path connectivity to the target server is simplified. As discussed herein, a homogeneous switch environment refers to an environment in which KVM switches employed by a company are of the same brand, make, and model (e.g., Avocent AV200 KVM Switch). Since the KVM switches share the same command protocol structures, the operating systems of the KVM switches are able to communicate with one another to establish a data path connectivity through any available KVM switch.

FIG. 2 shows an example of a homogeneous KVM switch environment. Five groups of servers (202a, 202b, 202c, 202d, and 202e) are connected to a group of consoles (210a, 210b, 210c, 210d, 210e, and 210f) via a plurality of KVM switches (204a, 204b, 204c, 204d, 204e, 206a, 206b, 206c, 208a and 208b).

In an example, the user may enter keyboard commands to initialize KVM switch 208b and to select target group of servers (GOS) 202d. By executing the keyboard commands, KVM switch 208b sends the request to the target server or to the next available KVM switch. Since KVM switch 208b is not directly connected to GOS 202d, the signal is forwarded to KVM switch 206c. Upon receiving the signal, KVM switch 206c forwards the signal to KVM switch 204d since target GOS 202d is not directly connected to KVM switch 206c. As KVM switch 204d is directly connected to target GOS 202d, a connection is made between console 210f and GOS 202d.

However, a heterogeneous switch environment may be more prevalent in today's acquisition and merger enterprise environment. As discussed herein, a heterogeneous switch environment refers to an environment in which one or more KVM switches employed by a company are of different brands, makes, and/or models. Note that heterogeneous switch environment may include homogeneous switches. As distinct command protocols (i.e., communication syntaxes which KVM switches use to send switch command signals from a console) may exist for heterogeneous KVM switches, the operating systems of the KVM switches may be incommunicable with one another in order to establish data path connectivity by executing a single command.

FIG. 3A shows a heterogeneous KVM switch environment. A KVM switch 302 is connected to KVM switches 304 and 306; connected to KVM switch 302, via KVM switch 304, are KVM switches 308 and 310. A group of servers (GOS)312 and consoles 314a, 314b, and 314c are connected to KVM switch 302. Connected to KVM switch 304 are a console 316 and a GOS 318. Also connected to KVM switch 306 is a GOS 320. Attached to KVM switches 308 and 310 are a GOS 322 and a GOS 324, respectively.

FIG. 3B represents a flowchart outlining the steps establishing data path connectivity in a heterogeneous switch environment. FIG. 3B will be discussed relative to FIG. 3A. Consider the situation wherein, for example, a user at console 314c wants to connect to GOS 322. Unless the user knows the data path to establish connectivity, the user may have to employ a trial-and-error method (i.e., randomly selecting a server) at each KVM switch in order to determine the appropriate data path. Since the data path establishing connectivity between the two include three heterogeneous KVM switches (302, 304, and 308), the operating systems of the KVM switches may be incommunicable forcing the user to remember, repeat, and use multiple command structures at each KVM switch (302, 204, and 208).

Keyboard based switch commands (i.e., a first set of command protocols) may be entered by the user at console 314c to initialize KVM switch 302, which is not directly connected to GOS 322 (steps 352 and 354). The OSD appears with a list of available server ports that are connected to KVM switch 302 (step 356), wherein the user may either page-down through the list or type in the server name (step 358). In order to determine the next KVM switch along the data path, the user may select/highlight a server port (step 360) by employing a trial-and-error method. Once a server port has been selected, the user may press the enter key (step 362) which may shut down the OSD (step 364) and may execute the switch command protocol enabling the user access to the new server or groups of server ports (step 366) at the next KVM switch using the next switch command protocol.

However, if the new server is not located within the same GOS or along the same data path as KVM switches 302, 304, and 308 (step 368), the user may have to return to the previous KVM switch (e.g. KVM switch 302) to repeat the process until successfully connecting to the next target server (i.e., GOS 318) is established (step 370). From GOS 318, the user may employ a second set of command protocols to connect to the next KVM switch (i.e., KVM switch 308). Steps 352 to 366 are repeated at KVM switches 304 and 308 until the user reaches the group of server ports at which the target server (GOS 322) resides. In the above example, three different command protocols are employed before the user is connected to GOS 322 (step 370).

There are several disadvantages associated with a heterogeneous KVM switch environment. For example, since the operating systems of heterogeneous KVM switches are incommunicable with one another, the user may have to spend more time to establish data path connectivity between the KVM switches. Further, while establishing the data path connectivity, the user may be required to authenticate (e.g., user name, password, etc.) at each KVM switch. For some users, this process may become repetitive and tedious, especially in a larger enterprise environment.

Another disadvantage exists when a user requests unauthorized access to certain servers on a KVM switch. Since not all KVM switch employs an authentication module, the user may be able to connect to all unprotected servers on the KVM switch.

SUMMARY OF INVENTION

These and other features of the present invention will be described in more detail below in the detailed description of the invention and in conjunction with the following figures.

The invention relates, in an embodiment, to a computer-implemented method of coupling a user interface device (UID) with a system device. The UID and the system device are coupled with a set of heterogeneous user interface device (UID) switches. The method includes providing a switch command server (SCS). The switch command server is in electronic communication with the set of UID switches. The method also includes receiving at the SCS a switch/location agnostic connectivity indication (SLACI). The SLACI is generic with respect to switch-specific command syntax. The SLACI is received from a SLACI-origination device that is location agnostic with respect to the UID switch. Also, the SLACI indicates an identity of the UID and an identity of the system device. The SLACI further indicates a desire to provide a complete data path between the UID and the system device. The method further includes performing protocol negotiation, using the SCS and the SLACI to ascertain at least one available data path between the UID and the system device. The method additionally includes formulating, using the SCS, a set of switch commands. The set of switch commands being configured to instruct the set of UID switches to connect the UID and the system device along the available data path to form the complete data path. The method yet further includes transmitting the set of switch commands from the SCS to the set of UID switches, thereby causing the set of UID switches to connect, upon executing the set of switch commands, the UID with the system device.

In another embodiment, the invention relates to an arrangement for coupling a user interface devices (UID) with a system device. The UID and the system device are coupled with a set of heterogeneous user interface device (UID) switches. The arrangement includes a set of protocol modules associated with the set of UID switches. Individual one of the set of protocol modules includes switch-specific information that is specific to respective one of the set of UID switches. The arrangement also includes a switch command server (SCS). The switch command server is in electronic communication with the set of UID switches. The SCS is configured to generate, responsive to a receipt of a switch/location agnostic connectivity indication (SLACI), a set of switch commands using switch-specific information associated with a first subset of UID switches located along an available data path between the UID and the system device. The SCS is further configured to transmit the set of switch commands to the first subset of UID switches to cause the subset of UID switches to create a complete data path between the system device and the UID. The SLACI is generic with respect to switch-specific command syntax. Also, the SLACI is received from a SLACI-origination device that is location agnostic with respect to the UID switch. Further, the SLACI indicates at least an identity of the UID and an identity of the system device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
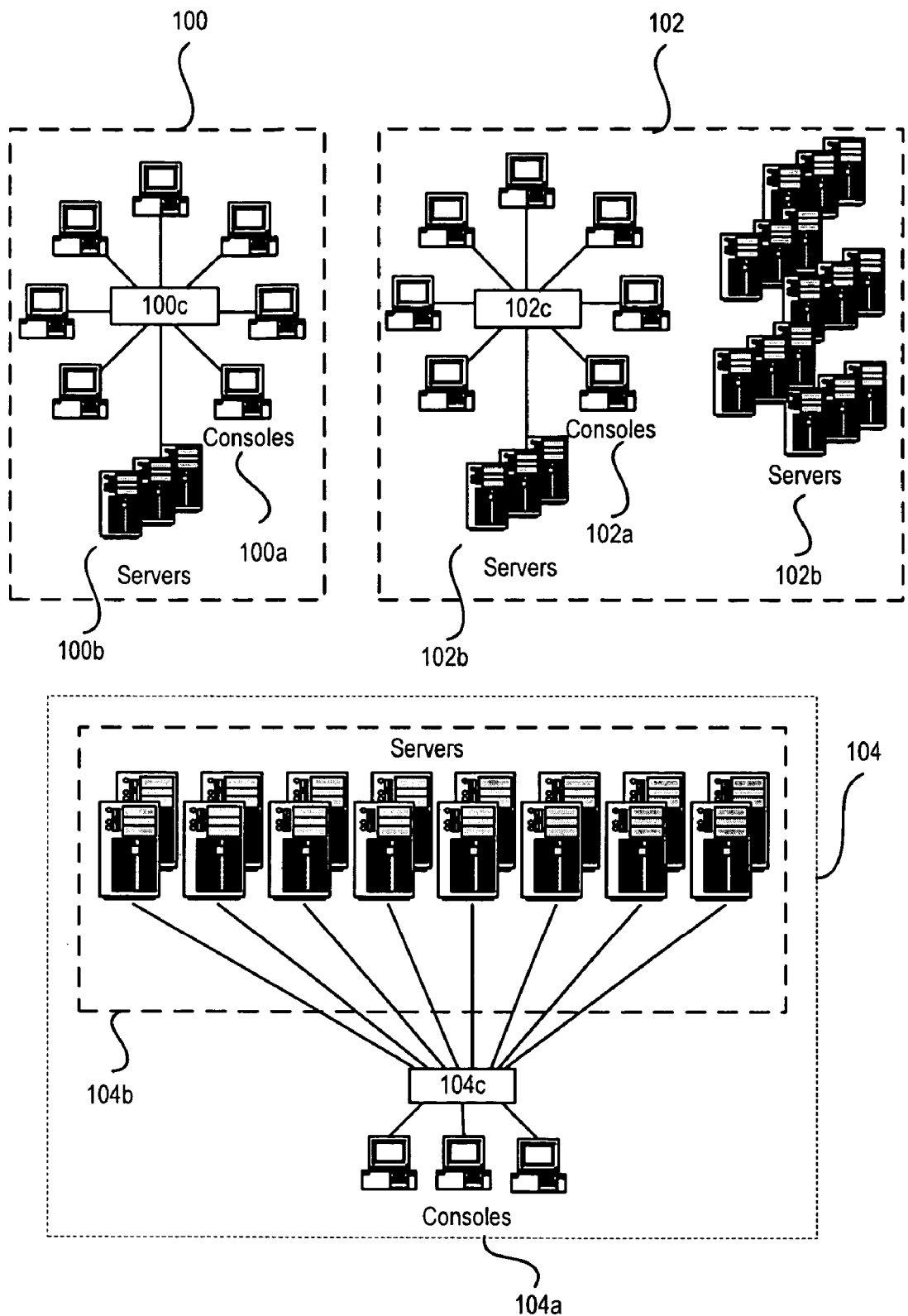
FIG. 1 shows an example of a simple enterprise switch environment.
Figure 2:
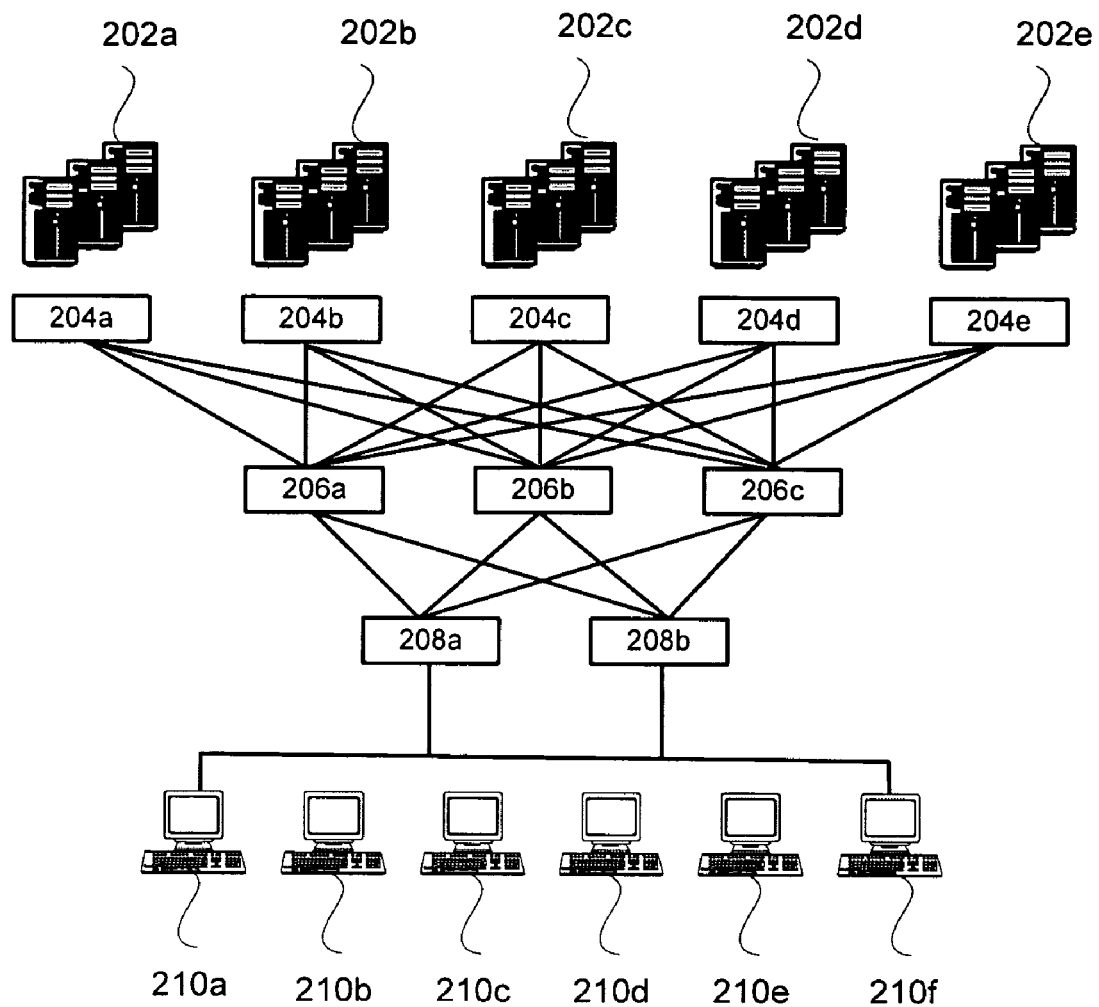
FIG. 2 shows an example of a homogeneous KVM switch environment.
Figure 3A:
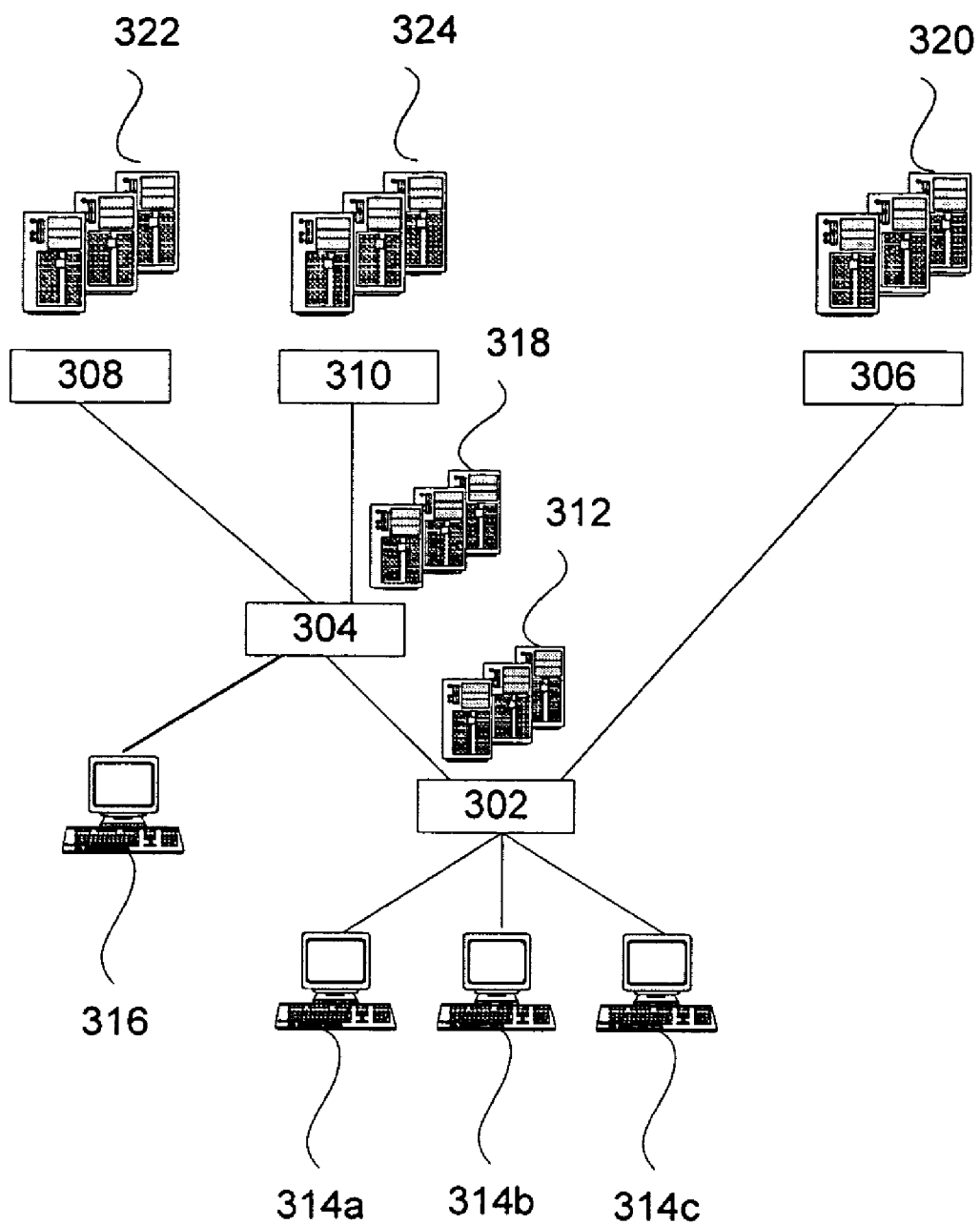
FIG. 3A shows an example of a heterogeneous KVM switch environment.
Figure 3B:
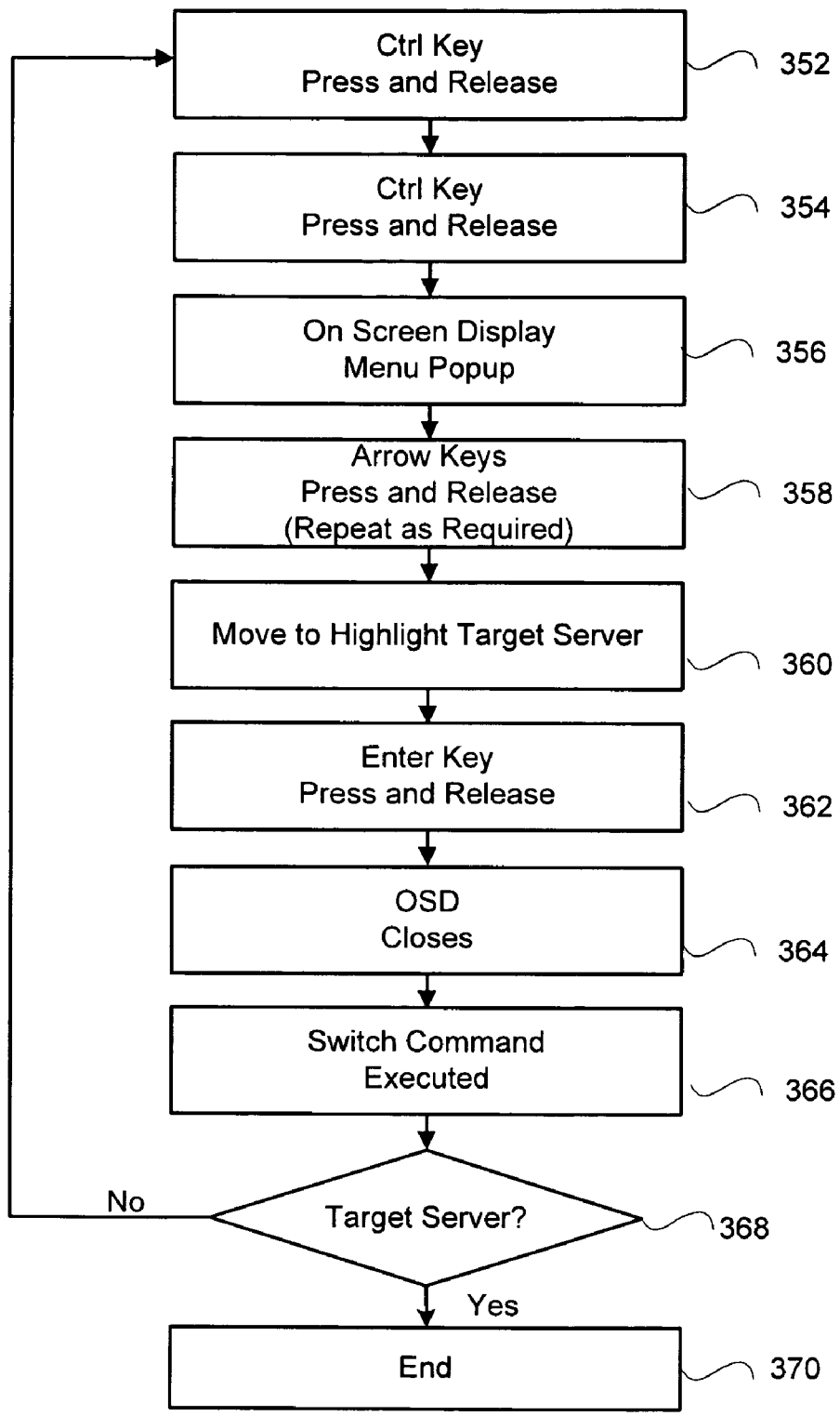
FIG. 3B represents a flowchart outlining the steps establishing data path connectivity in a heterogeneous switch environment.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there is provided an architectural arrangement in which a maintenance network management operating system (MNMOS) provides a user-friendly, remote, third party management network system designed to integrate dissimilar infrastructure technologies (e.g., user interface device switches, AC power, environmental sensors, data acquisition, video over IP, etc.) under a single application. Further, the MNMOS includes a database and user interface system that integrates the management of multiple heterogeneous products for a single point of access, management and control.

In an embodiment, the MNMOS is designed around a modular structure including a main shell, a database, and product specific modules that may define communication and commands for any number of remotely managed products and technologies. Further, the MNMOS may provide internal communication with the database and product specific modules that may define and translate commands sent to external hardware device. In an embodiment, the communication methods used to enable the MNMOS to provide a seamless network may include direct serial and TCP/IP network connections.

It should be noted that it is not a requirement that the MNMOS replaces the terminal on-screen display or keyboard hot-key methods of controlling a switch system. Instead, the MNMOS, in an embodiment, may consolidate control and management of multiple heterogeneous switching devices in various locations under a common user interface. In this manner, the MNMOS allows local, remote, and automated operators to activate switching functions that would normally be managed only at the controlling output port of a respective and/or compatible switch. In other words, the MNMOS may utilize the communication service port to provide the human operator greater operational control of input/output (I/O) ports across a heterogeneous user interface device (UID) switch environment. As discussed herein, a heterogeneous UID switch environment refers to an environment in which one or more UID switches employed by a company are of different brands, makes, and/or models. Note that heterogeneous switch environment may include homogeneous switches.

As discussed herein, UID switches refer to switches that form a connection (either hardwired, in combination with other UID switches, or via a network such as an IP network) between a UID (e.g., monitor, keyboard, mouse, trackball, etc.) and a system device to allow data to be transmitted between the UID and the system device. An example of a UID switch may include, but is not limited to, a KVM switch. Examples of system devices may include, but are not limited to, computers, servers, and power supply units.

In this document, various implementations may be discussed using UID switches as an example. This invention, however, is not limited to UID switches and may be employed with any device that supports remote switching and/or data acquisition including, but is not limited to, remote power devices, environmental and other data sensors, video over IP cameras, analog and digital keyboard-video-mouse switches, hybrids, and console servers.

For illustration purposes, consider for example, the heterogeneous UID switch environment situation. In the prior art, a human operator employs a trial-and-error method to determine data path connectivity by entering multiple UID switch commands. The situation may result in user frustration, particularly if the human operator operates in a large enterprise environment.

The MNMOS includes a switch command server (SCS). As discussed herein, a SCS refers to hardware, software, and/or firmware that may be "in electronic communication" with the UID switches in that the SCS can communicate with and issue command to the UID switches, either directly or through protocol modules. In an embodiment, the SCS may provide the main user interface, advanced switching control methods as well as external communication with the other MNMOS modules and hardware devices. In other words, the SCS may manage outward and incoming requests for connectivity between a user interface device (UID) and a system device.

In an embodiment, the SCS may provide a user interface that enables desktop switching. Desktop switching refers to a method by which a human operator at a UID may perform a switch/location agnostic connectivity indication (SLACI) to establish connectivity between his UID and a specific system device. Desktop switching may further encapsulate a method of organizing a plurality of switches, system devices, and UIDs with a plurality of remote access methods under a common user interface.

As discussed herein, SLACI refers to a human-provided or machine-provided command or set of commands (i.e., one or more commands) to the SCS to connect a UID to a system device via a set of UID switches (i.e., one or more UID switches), or a set of UIDs (i.e., one or more UIDs) to a set of system devices (i.e., one or more system devices) via a set of UID switches. If the SLACI is human-originated, the SLACI may involve any user action that indicates the identity of the UID and the identity of the system device, along with an indication of a desire to connect the UID and the system device. Examples of such user action may include drag-and-drop, double-clicking, key-clicking, and hot key clicking. Refer to Table 2 for further details about these user actions.

In the case of a human-provided SLACI, the human-provided SLACI may be received via a SLACI-originating device, which may be a console that is under control by a user or a third-party administrator. If the SLACI is machine-provided, the SLACI may originate from a software, firmware, and/or hardware located anywhere on the network (i.e., not required to be part of the UID switch to be controlled) in response to a triggering condition, for example.

Furthermore, the SLACI is switch agnostic in the sense that the SLACI is generic with respect to the command syntax of any particular UID switch. Accordingly, the user may not need to change syntax of the SLACI when different switches are employed in the network. Thus, the user may be insulated from having to learn the specifics of a UID switch (since the specifics of any given UID switch is encapsulated in the protocol module, in an embodiment).

Additionally, the SLACI is location agnostic in the sense that the SLACI-originating device, whether a console to receive a human-provided SLACI or a module to generate a machine-provided SLACI, may be located anywhere on the network as long as the SLACI can be received by the SCS.

To further elaborate, consider the situation wherein, a user wants to connect a UID to a system device. In the prior art, the process may require multiple user actions to achieve accessibility via OSD menus and/or keyboard commands. Further, if the user's UID is a remote IP UID, additional user actions may be required to open a browser and to locate an access point. With desktop switching, a user may employ a SLACI to connect a UID to a system device.

Unlike the prior art, the action steps to connect the two devices may be handled behind-the-scene by the SCS. The user no longer has to employ a trial-and-error method to establish data path connectivity. Instead, the SCS may employ advanced switching control methods as well as external communication with the hardware devices to establish data path connectivity.

In an embodiment, the SCS may manage the data path connectivity by performing network discovery. As discussed herein, network discovery refers to a data acquisition process, which may involve identifying the devices (e.g., servers, consoles, UID switches, etc.) that may be on the network. Further, network discovery may determine hardware presence, data path types, their existence and availability in addition to data acquisition task.

Network discovery of data paths may use data from internal and/or external sources. To perform network discovery, the SCS may maintain an internal database that may include, but is not limited to, data on the I/O devices, the device types, the location of each device, the internal backbone structures of the switches, the internal-external connections between the devices and/or switches, and the current state of the internal-external connections. An external source of data may include, but is not limited to, data from SLACI.

The SCS may further manage the data path connectivity by performing protocol negotiations. As discussed herein, protocol negotiations refer to the process of determining the hardware devices that need to be switched (for routing a system device to a display device), querying the respective product libraries to obtain the appropriate switch command structures, using network discovery to determine data path existence, their types, and availability, building the individual switch commands and sending these commands to each switch device in order to align communication and control of a system device to a display device. Also as discussed herein, an available data path refers to a data path that may permit data to be transmitted between a UID and a system device if the UID switches in between connects the UID to the system device.

In an embodiment, a protocol module attached to the SCS may enable the SCS to perform protocol negotiations. As discussed herein, a protocol module refers to a software, firmware, or hardware construct (e.g., library) that holds data specific to a switch. Thus, the number of protocol modules attached to the SCS may depend upon the number of diverse switches employed in the network. In an example, if there are five different switches (i.e., has different brand, make, or model), five possible protocol modules may exist.

The data for the protocol module, in an embodiment, may include the brand, make, and model of a UID switch. Also, the protocol module may include, but is not limited to, communication method (e.g., analog, KVMoIP, PCI KVMoIP, console server, etc.), type of ID (e.g., binary, IP address, user name, etc.), method of initializing the UID switch, I/O string, authentication method, acceptable actions, command structures, and port information.

To illustrate how a local, remote, or automated operator's request may be managed in the MNMOS arrangement, consider the situation wherein, for example, a user wants to connect his UID to a system device. By using desktop switching, the user may employ a SLACI to send a request for connectivity. Upon receiving the signal, the SCS may start establishing data path connectivity.

As part of executing switch commands, the SCS may verify security, data path existence, and data path availability. Since the devices in the network may have already been associated with specific data stored on the SCS, the SCS may use internal network discovery to determine data path existence and availability. In other words, the SCS may analyze if and what communication path exists between devices, including devices connected to heterogeneous switches. This is in contrast with the prior art, whereas data about switch devices tends to be limited to the knowledge held by the operating system of a specific switch. Feedback may be provided to the operator if no data path exists or the data path is unavailable.

The SCS may also validate a user's access rights. In an embodiment, the SCS may employ an authentication module to perform the verification. As discussed herein, an authentication module refers to a database that includes user specific information including user's access rights. By using the authentication module, the SCS may provide the necessary authentication data at each switch. Further, the authentication module may provide security for switches that may not have authentication capability. Feedback may be provided to the operator if authentication fails.

Once verification has been completed, the SCS may assemble switch command(s) by applying the command structures/protocols stored in the protocol module(s) along with data previously collected or retained through network discovery. Then, the SCS may execute, in a sequential manner, the switch command(s) at the various switches in the data path. Once all switch commands have been properly assembled, validated and executed, a complete data path may be established. As discussed herein, a complete data path refers to the data path that exists after the UID switches make the connection.

In another embodiment, the MNMOS may also provide for group switching. As discussed herein, group switching refers to the process of employing a SLACI to connect a group of UIDs (i.e., two or more UIDs) to a group of system devices (i.e., two or more system devices). In the prior art, certain UID switches may allow a fixed set of system device ports to be switched as a group. The systems device ports may be physically bound in a fixed order; thus, an internal operating system may switch a fixed order of system device ports to a fixed order of an equal number of UID device ports. The human operator tends to have limited control over the order in which system devices are switched to UIDs. To change the order, the human operator may have to physically change the order of system devices on the UID switch.

Unlike the prior art, group switching is not limited by hardware capability of the UID switches. Instead, group switching may be employed to switch a plurality of system devices to a plurality of UIDs regardless of the hardware capability of the UID switches. An embodiment of the invention allows the human operator to dynamically arrange the order in which system devices are switched to UIDs, add and/or remove components of the group, and store multiple group profiles that can be utilized at any time. Hence, a human operator may create multiple groups of system devices where each system device may reside on one or more (homogeneous or heterogeneous) UID switches/locations. Also, the human operator may create multiple groups of UIDs where each UID may reside on one or more UID switches/locations.

In group switching, when a switch command structure is assembled to execute operations on multiple components of the same switch, the procedure may be executed in a loop until the last switch command is assembled and executed. In an example, a user wants to connect a group of two UIDs with a group of two system devices. Two UID switches are located on the data paths between the two devices. Hence, to enable connection, switch commands may be performed multiple times at each of the UID switches.

In yet another embodiment, the MNMOS may provide for third party switching. As discussed herein, third party switching refers to the process of connecting a UID to a system device in which the action is initiated by a third party. In other word, the human/machine operator making the request for connectivity may be employing a SLACI to establish connectivity between another user's UID and a specific system device.

Third party switching may be performed manually (e.g., drag-and-drop switching, double click switching, key-click switching, or hot key switching). Additionally, third party switching may be performed automatically based on an operator-defined profile stored in the MNMOS and/or its associated modules. As discussed herein, profile refers to instructions for automatically executing a switch commands based on time, network events, and user scripts.

In yet another embodiment, the MNMOS may provide for remote user access. As discussed herein, remote user refers to an operator who may not be hardwired to UID switches and may request connectivity via an IP connection. This is in contrast to a local user who may be hardwired to UID switches. Since communication methods employed by the MNMOS may include TCP/IP network, remote user may be able to work from anywhere in the world and still may be able to access digital and analog switch environments. In an example, a remote user residing in Hong Kong requests for a connection with a system device located in New York. In the prior art, the remote user may have to open a browser, point to an IP access point, and use a trial-and-error method to establish a data path at each UID switch. Unlike the prior art, the SCS may perform these functions by allowing a user to open a user browser, connecting to and passing log-in data to an available IP access point while aligning data paths between the UID switches. With MNMOS, geographical limitations may be eliminated.

Figure 4:
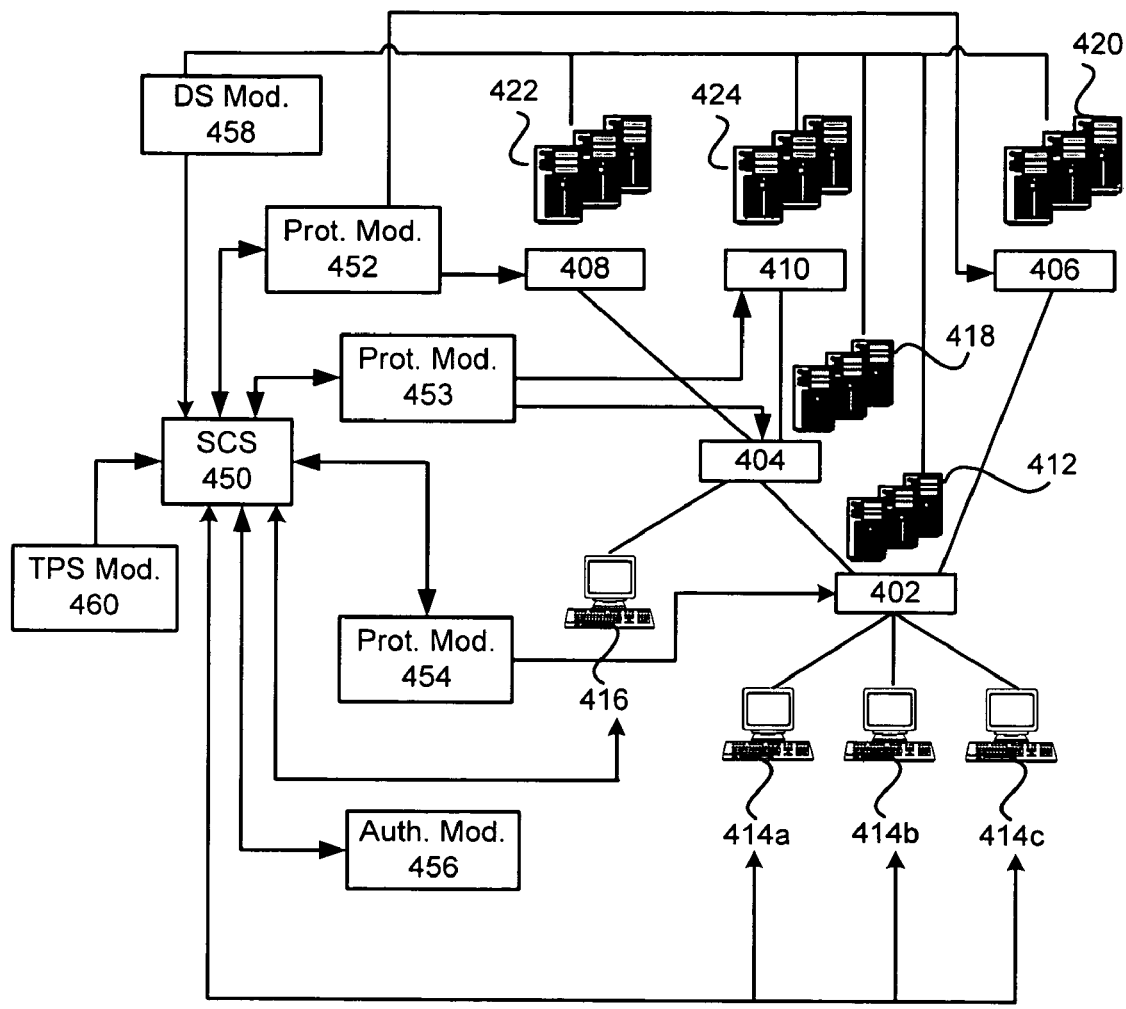
FIG. 4 shows, in an embodiment, a MNMOS that is superimposed on a heterogeneous UID switch environment.

The features and advantages of embodiments of the invention may be better understood with reference to the figures and discussions that follow. FIG. 4 shows, in an embodiment, a MNMOS that is superimposed on a heterogeneous UID switch environment. The heterogeneous switch environment includes a UID switch 402 connected to UID switches 404 and 406, and UID switch 402 is also connected to UID switches 408 and 410 via UID switch 404. Further, a group of system devices (GOSD) 412 and UIDs 414a, 414b, and 414c are connected to UID switch 402. Also, a UID 416 and a GOSD 418 are connected to UID switch 404 and a GOSD 420 is connected to UID switch 406. In addition, GOSDs 422 and 424 are attached to UID switches 408 and 410, respectively. The MNMOS may include a SCS 450, protocol modules (452, 453, and 454), an authentication module 456, a desktop switching module 458, and a third party switching module 460.

Consider the situation wherein, for example, a user at UID 414c may want to connect to GOSD 422. By employing desktop switching module 458, the user may connect from UID 414c to GOSD 422 by performing a SLACI to request for data path connectivity.

Figure 5:
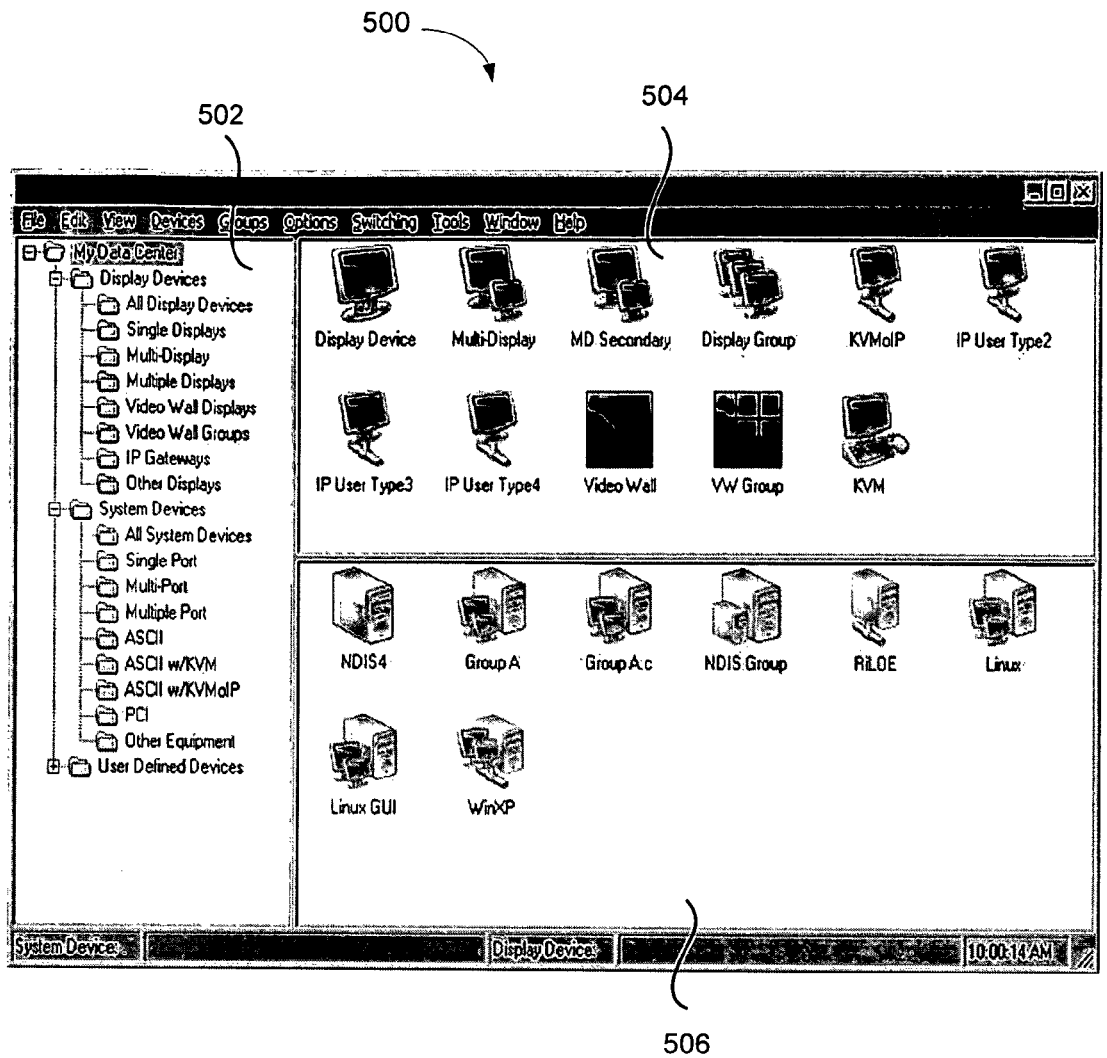
FIG. 5 illustrates, in an embodiment, an example of desktop switching.

FIG. 5 illustrates, in an embodiment, an example of desktop switching. User at UID 414c may have a user interface 500 that may include three panels (502, 504, and 506). Panel 502 may show a tree-like structure with a plurality of types and physical locations of UIDs and system devices. The available UIDs may be clustered in the upper right window (panel 504) and the available system devices may be clustered in the lower right window (panel 506). In an example, the user at UID 414c may request connectivity by dragging a system device in panel 506 (i.e., GOSD 422) to his UID in panel 504 (i.e., UID 414c). Depending on administrator and users option settings, the same commands may be executed by reversing the drag and drop action.

Referring back to the example in FIG. 4, once the user has completed the user action to create the connectivity, no additional user interaction may be needed. Unlike the prior art, SCS 450 may perform advanced switching control logic, in an embodiment, to establish data path connectivity. The SCS may manage the data path connectivity by continuously performing data path management and protocol negotiations.

In an embodiment, protocol modules (452, 453, and 454) attached to SCS 450 may enable SCS 450 to perform protocol negotiations. Protocol modules (452, 453, and 454) are optional modules. Generally, the number of protocol modules attached to the SCS may vary depending upon the number of heterogeneous switches.

Figure 6:
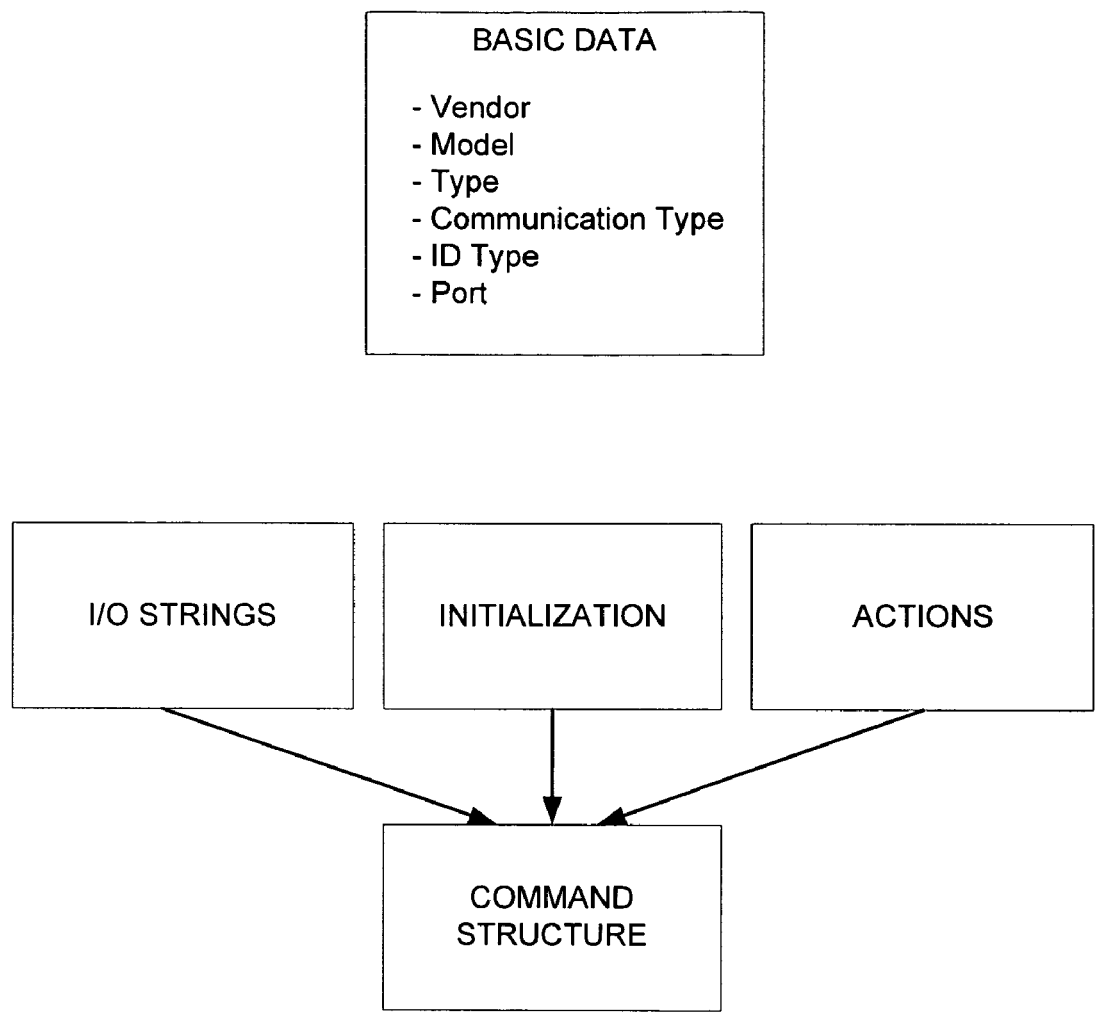
FIG. 6 shows, in an embodiment, a protocol module.

FIG. 6 shows, in an embodiment, a protocol module. The protocol module may include some basic information about a UID switch, such as vendor, model, type, communication type, ID type, and ports. More details are provided in Table 1 below. In addition, the protocol module may also include data that may be employed to formulate the command structure for the switch. In an example, the command structures may include initialization data (i.e., keyboard commands), I/O string data, and actions. As discussed herein, actions refer to a list of acceptable actions that a UID switch may perform.

TABLE 1

Basic Information for Protocol Module

| Name | Description | Examples |
|---|---|---|
| Vendor | Name of the manufacturer | Avocent, Raritan, Cybex, Belkin |
| Model | The model name | 8 × 32, 16 × 64 |
| Type | Communication methodology | analog, kvm/ip hybrid, PCI KVM/IP, or console serve |
| Communication type | Method for communicating with other devices | serial, IP, ASCII commands over IP |
| ID Type | Data about the structure of a command stream | binary, IP address, user name |
| Ports | Data about the ports on the UID switch | number of ports, port Ids, port address |
| Data Acquisition | Component details | Serial numbers, part numbers, current state, status and testing information of internal components |
| Data Path Testing | Connectivity Validation | Testing the correct and valid state of internal and external components of the UID switch hardware like wiring, proper interconnectivity and communication paths between UID switch hardware |

Referring back to FIG. 4, SCS 450 may further manage data path connectivity by performing network discovery, in an embodiment. To enable network discovery, SCS 450 may maintain a database that may include, but is not limited to, data on the I/O devices, the device types, the location of each device, the internal backbone structures of the switches, the internal-external connections between the devices and/or switches, and/or the current state of the internal-external connections.

Figure 7:
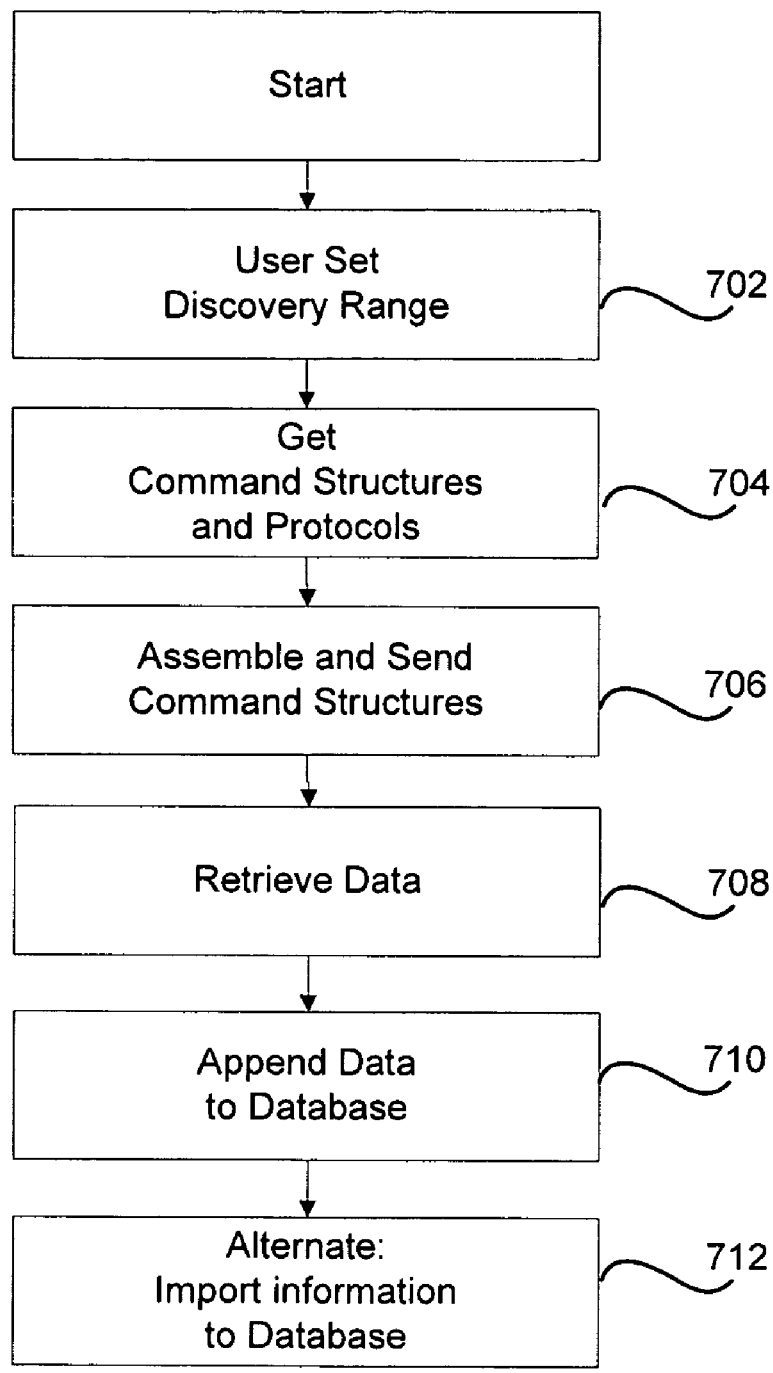
FIG. 7 shows, in an embodiment, a flowchart outlining the steps for collecting the pertinent data used in the network discovery process.

FIG. 7 shows, in an embodiment, a flowchart outlining the steps for collecting the pertinent data used in the network discovery process. The administrator may start the process (step 702) by setting a discovery range (e.g., want to find all of the Raritan products). The SCS may then gather the various command structures from the protocol modules (step 704). The command structures may be sent (step 706) to retrieve information from each UID switch and server (step 708). The information collected from the UID switches and servers may be appended to a database (710) stored by the SCS or other modules. Alternatively, if the information is readily available, the administrator may upload the information to the database.

Referring back to FIG. 4, prior to executing switch commands, SCS 450 may verify security by using authentication module 456, in an embodiment. By using authentication module 456, SCS 450 may provide the necessary authentication data at each switch. Further, authentication module 456 may provide security for switches that may not have authentication capability and interact with existing external security services.

Figure 8:
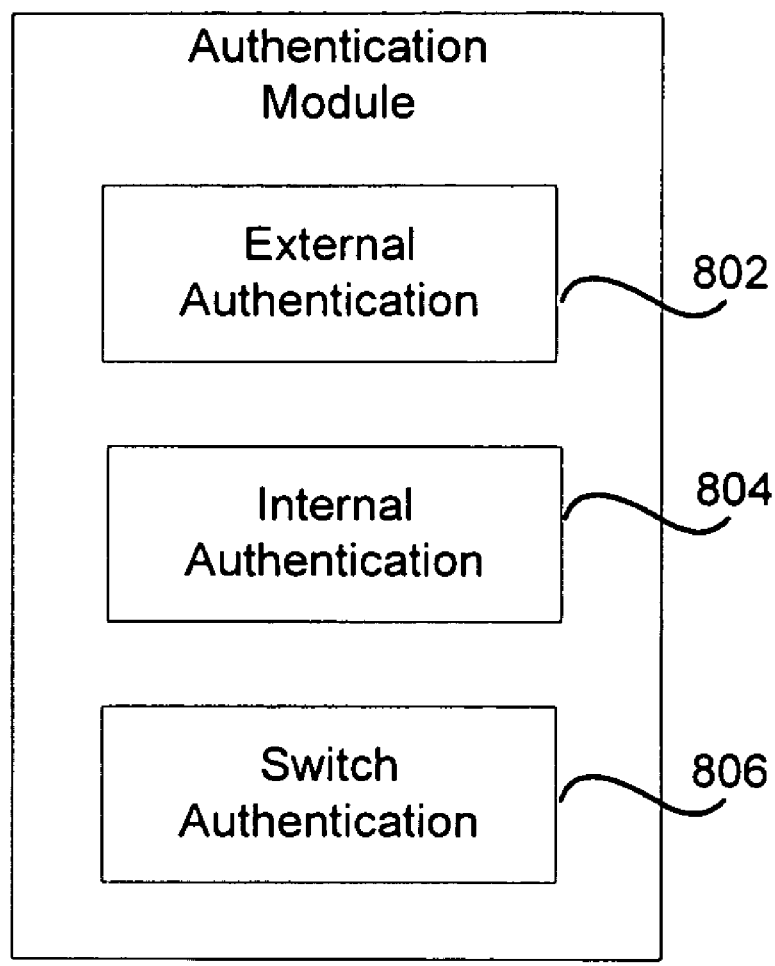
FIG. 8 shows, in an embodiment, an authentication module.

FIG. 8 shows, in an embodiment, an authentication module. Authentication may occur through three methods: an external authentication method 802, an internal authentication method 804, and a switch authentication method 806. Consider the situation wherein, for example, a user wants to connect to a system device. To connect to a UID switch, the SCS may first apply external authentication method 802 (e.g., L-Dap, radius or Active directory, etc.). However, if an external authentication method is not applicable, then the SCS may apply internal authentication method 804 (i.e., preset options as determined by an administrator). If neither external nor internal authentication methods exist, then the SCS may apply switch authentication method 806 (e.g., authentication specific to a switch). Note that any switch authentication method may be applied before other authentication method.

Referring back to FIG. 4, the MNMNOS may also provide for third party switching module 460, in an embodiment. Third party switching may be performed manually (e.g., drag-and-drop switching, double click switching, key-click switching, or hot key switching) or automatically (e.g., time switching, event switching, or echo switching) by a third party. Refer to Table 2 below for descriptions of the various third party switching methods. Generally, with the automatic third party switching approach, the SCS may access profiles (e.g., instructions for performing a switch) that a user may have previously set up.

TABLE 2

Third-Party Switching

| Approach | Method | Description |
|---|---|---|
| Manual | Drag-and-drop | Drag a system device to a user interface device using a computer pointing device, which may include mouse, track pad, track ball, etc . . . |
| Manual | Double clicking | Click twice on a system device or a UID |
| Manual | Key click | Select a user interface device, presses a key modifier, and then selects a system device |
| Manual | Hot key | Preset keys to give commands for selecting a system device |
| Automatic | Time | Switching occurs at a specific time |
| Automatic | Event | Switching occurs due to a specific event |
| Automatic | Echo | Switching occurs to an administrator user interface device when a sensitive system device is accessed |
| Automatic | Sequenced | Switching occurs in a specific sequence of server ports at specified intervals |
| Automatic | User Scripts | Switching occurs due to user defined events (i.e. completion of a test process) |
| Automatic | Group | Switching occurs based on actions taken on user defined device groups |
| Automatic | Desktop | Switching occurs due to actions taken at a selected server |

Figure 9A:
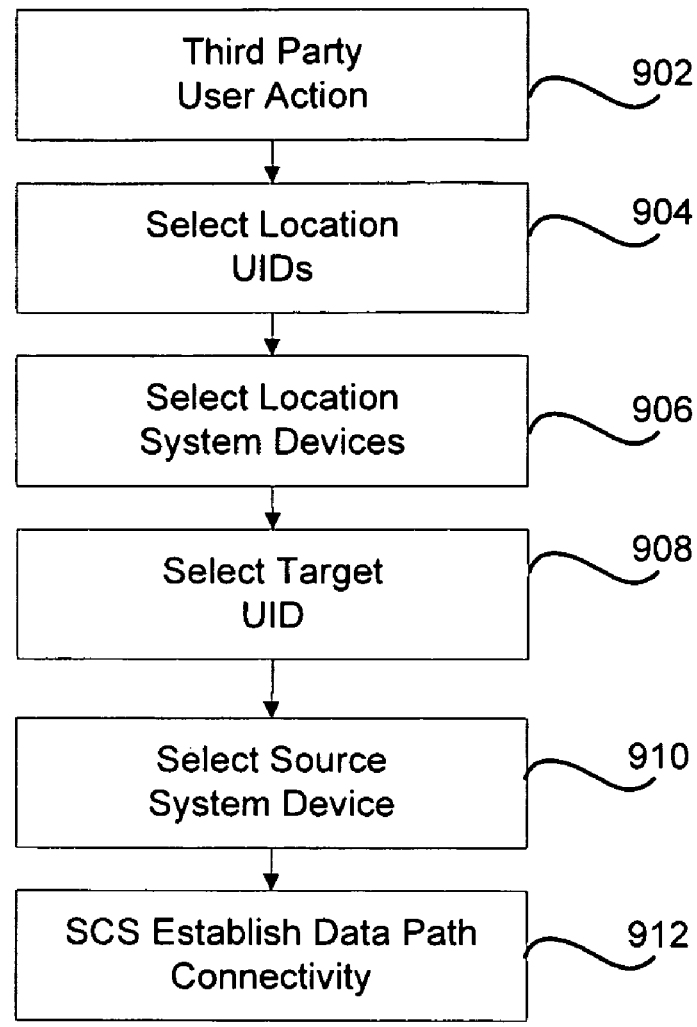
FIG. 9A shows, in an embodiment, a simplified flow chart representing the steps for handling a manual third party switching.

FIG. 9A shows, in an embodiment, a simplified flow chart representing the steps for handling a manual third party switching. FIG. 9A is discussed in relation to FIG. 4. At step 902 a third party user (e.g., administrator) at UID 416 may request for connectivity between UID 414c and GOSD 422. The third party user at UID 416 may first select a location of UIDs (step 904) and a location of system devices (step 906). Once the UIDs and system devices are displayed on the third party user's console (i.e., UID 416), the user may select a target UID (step 908), such as UID 414c, and a source system device (step 910), such as GOSD 422. At step 912, the SCS may establish data path connectivity between UID 414c and GOSD 422.

Figure 9B:
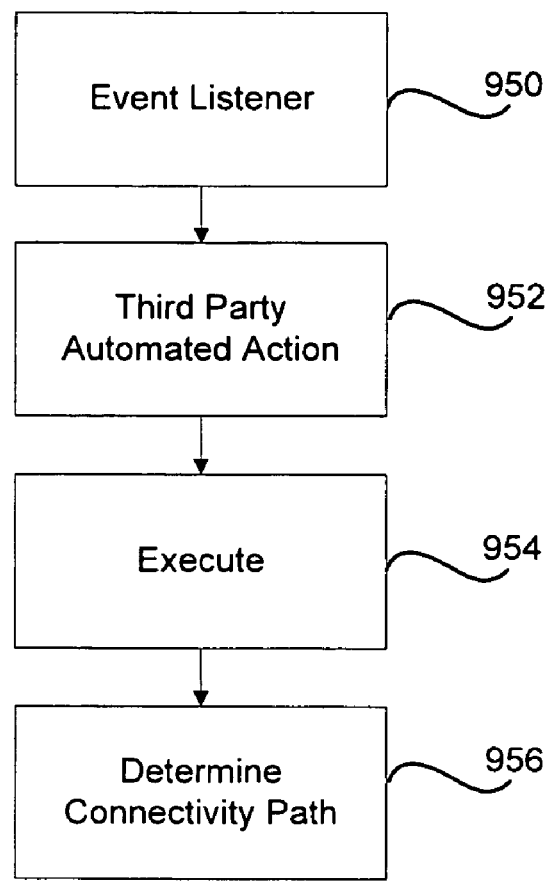
FIG. 9B shows, in an embodiment, a simplified flow chart representing the steps for handling an automatic third party switching.

FIG. 9B shows, in an embodiment, a simplified flow chart representing the steps for handling an automatic third party switching. Before automatic third party switching may occur, the user may create a profile for each switching event. Once an event listener identifies an event (step 950) as one of the preset profiles, an automatic action may occur (step 952). With the execution of the event (step 954), the SCS may begin establishing data path connectivity (step 956).

Figure 10:
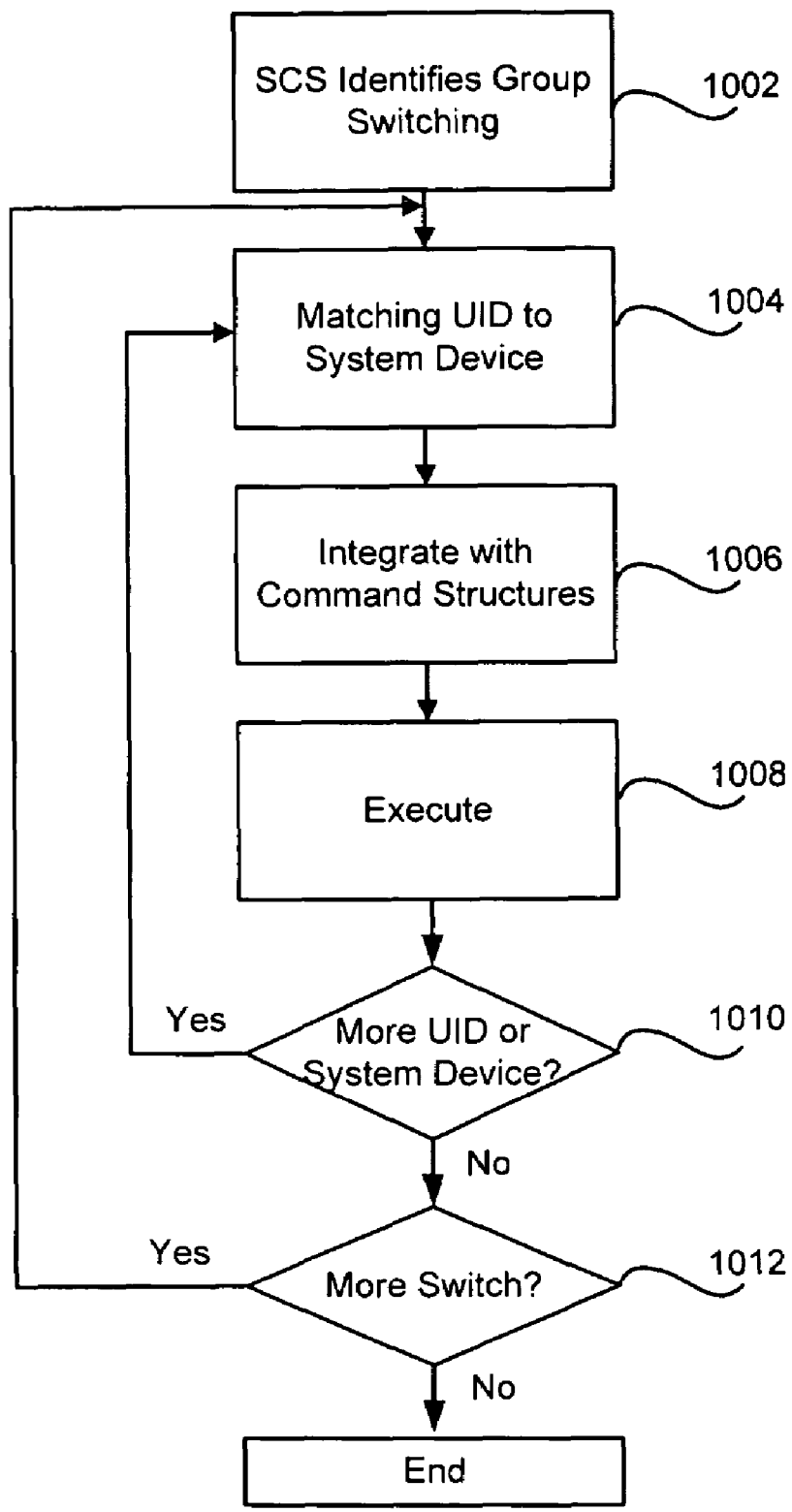
FIG. 10 shows, in an embodiment, a simplified flow chart representing the steps enabling group switching.

In an embodiment, the MNMOS may also provide for group switching. FIG. 10 shows, in an embodiment, a simplified flow chart representing the steps enabling group switching. FIG. 10 is discussed in relation to FIG. 4. Group switching may be employed to switch a plurality of system devices to a plurality of UIDs regardless of the hardware capability of the UID switches. An embodiment of the invention allows the human operator to dynamically arrange the order in which system devices are switched to UIDs, add and/or remove components of the group, and store multiple group profiles that can be utilized at any time.

When a switch command structure is assembled to execute operations on multiple components of switch, the procedure may be executed in a loop until the last command structure has been assembled and executed. Consider the situation wherein, for example, a user wants to connect from a three-users interface device group (e.g., UIDs 414a, 414b, and 414c) to a group of three servers, such as GOSD 422. Two UID switches (UID switches 404 and 408) are located on the data path between the two devices. At step 1002, the SCS may identify a group switching situation. At step 1004, a first UID (e.g., UID 414a) may be matched with a first system device (e.g., a system device in GOSD 422). The devices may be integrated with the command structure to form a first switch command (step 1006). The first switch command may be executed at step 1008. After the first switch command has been executed, the SCS may repeat steps 1004 through 1008 until each system device has been matched with a UID (step 1010). At step 1012, if additional switches are in the data path, the SCS may repeat steps 1004 through 1010 until all switches in the data path have been activated.

Built into the group switching logic is an error handler that manages mismatched UID and system device groups. In an example, if the number of UIDs exceeds the number of system devices, then the group switching logic may perform no action on the remaining UIDs or may connect one or more of the system devices to more than one UID. In another example, if the number of system devices exceeds the number of UIDs, then the group switching logic may perform no action at all or may perform switching until all UID devices are exhausted.

Figure 11:
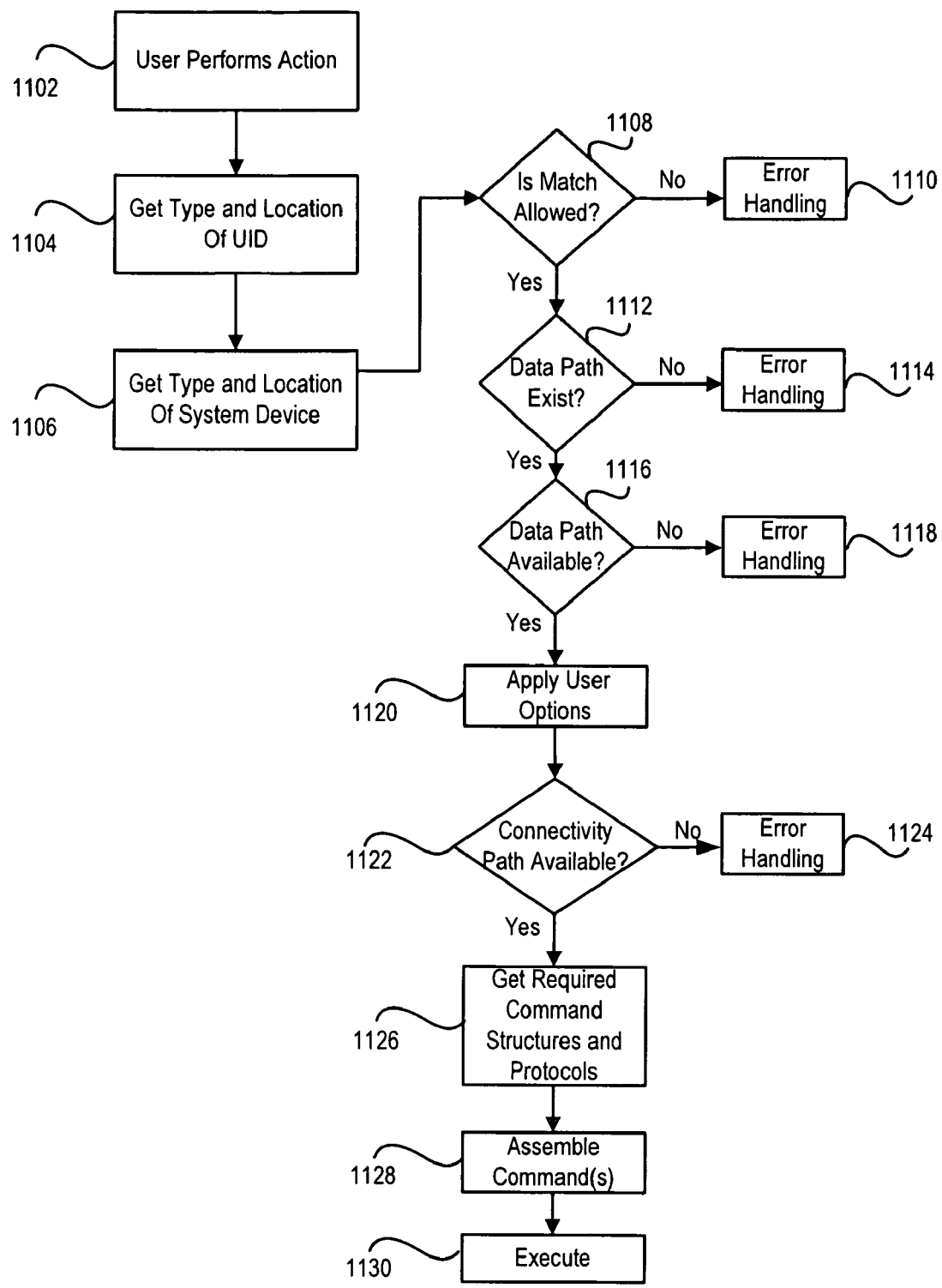
FIG. 11 shows, in an embodiment, a flowchart illustrating how a local, remote, or automated operator's request may be managed in a MNMOS arrangement.

FIG. 11 shows, in an embodiment, a flowchart illustrating how a local, remote, or automated operator's request may be managed in a MNMOS arrangement. Consider the situation wherein, for example, a user wants to connect his UID to a system device. At step 1102, the user may click on the system device. The signal that is sent to the SCS may contain information regarding the type and location of the user's UID and the selected system device (steps 1104 and 1106).

At step 1108, the SCS may determine the feasibility of a match. In an embodiment, the SCS may employ the authentication module to verify the user's access privilege to the system device. Further, while authentication is occurring, the SCS may apply additional logic to determine whether the UID and system device are able to communicate with one another. In an example, the SCS may determine that a user on an analog backbone may be unable to access remote servers.

At step 1110, the SCS may determine whether a data path exists. If no data path exists then error handling may occur at step 1112. Error handling may include, but is not limited to recording the action on a log and notifying the user. However, if the data path exists, then the SCS, at step 1114, may determine data path availability. If the data path is currently unavailable, then error handling may occur (step 1116). Error handling may include checking for data path availability at pre-determined intervals. However, if the data path is available then the SCS may proceed to step 1118 to check for any existing user option. User option may include preset options or manual user inputs.

At step 1120, the SCS may determine data path connectivity. Again, if the data path is unavailable then error handling may occur (1122). Assuming data path connectivity, the SCS may gather the command structures and protocols stored in the protocol modules (step 1124). Then, the SCS may assemble the command structures (step 1126) and may sequentially execute the switch commands (step 1128).

As can be appreciated from embodiments of the invention, the MNMOS seemingly transforms a large complex heterogeneous switch environment into a simplified homogeneous environment. With the present invention, the human operator, with a SLACI, can now globally manage and maintain various system devices on heterogeneous switches with a common user interface. By simplifying the task that a human operator would typically perform in establishing data path connectivity, the MNMOS greatly increases efficiency and productivity while reducing human errors.

While this invention has been described in terms of several embodiments, there are alterations, permutations, and equivalents, which fall within the scope of this invention. For example, although the examples in the figures discuss implementing the MNMOS to UID switches, the MNMOS may also be apply to any device that supports remote switching and/or data acquisition including but not limited to remote power devices, environmental and other data sensors, video over IP cameras, analog and digital keyboard-video-mouse switches, hybrids, and console servers. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method of coupling a user interface device (UID) with a system device on a network, said UID and said system device being coupled with a set of heterogeneous user interface device (UID) switches, comprising:

providing a switch command server (SCS), said switch command server being in electronic communication with said set of heterogeneous ULD switches, said SCS being configured at least for managing requests for connectivity between said user interface device and said system device and establishing data path connectivity between said user interface device and said system device using at least one of said heterogeneous UID switches without requiring a user of said user interface device to manually perform network discovery to establish viable data paths between said set of heterogeneous UID switches;

receiving at said SCS a switch/location agnostic connectivity indication (SLACI), said SLACI being generic with respect to switch-specific command syntax, said SLACI being received from a SLACI-origination device that is location agnostic with respect to said set of heterogeneous UID switches, said SLACI indicating an identity of said UID and an identity of said system device, said SLACI further indicating a desire to provide a complete data path between said UID and said system device;

performing said network discovery using said SCS to manage said data path connectivity, said network discovery being performed automatically without human intervention, wherein said network discovery includes identifying at least internal backbone structures of said set of heterogeneous UID switches, hardware presence on said network, internal-external connections between said hardware and said set of heterogeneous UID switches, and current state of said internal-external connections;

performing protocol negotiation using said SCS and said SLACI, to ascertain at least one available data path between said UID and said system device, wherein said protocol negotiation being performed automatically without human intervention;

formulating, using said SCS, a set of switch commands, said set of switch commands being configured to instruct said set of heterogeneous UID switches to connect said UID and said system device along said available data path to form said complete data path wherein said set of switch commands being formulated automatically without human intervention; and transmitting said set of switch commands from said SCS to said set of heterogeneous UID switches, thereby causing said set of heterogeneous UID switches to connect, upon executing said set of switch commands, said UID with said system device, wherein said set of switch commands being transmitted automatically without human intervention.

2. The computer-implemented method of claim 1 wherein said performing network discovery includes generating data pertaining to said UIDs, set of heterogeneous UID switches, and said system devices that are available for interconnection using said SCS.

3. The computer-implemented method of claim 2 further comprising a set of protocol modules, each of said set of protocol modules being specific to a respective one of said set of heterogeneous UID switches and contains switch-specific information pertaining to said respective one of said set of heterogeneous UID switches.

4. The computer-implemented method of claim 3 wherein said formulating is performed using data pertaining to said available data path and switch-specific information associated with said set of heterogeneous UID switches disposed along said available data path.

5. The computer-implemented method of claim 3 wherein said SLACI is received from a human being via said UID.

6. The computer-implemented method of claim 3 wherein said SLACI is received from a human being via a console that is different from said UID.

7. The computer-implemented method of claim 6 wherein said console is geographically remote from said SCS and communicates with said SCS via the Internet.

8. The computer-implemented method of claim 1 wherein said SLACI is machine-provided.

9. The computer-implemented method of claim 1 wherein said SLACI is transmitted to said SCS using the TCP/IP protocol.

10. The computer-implemented method of claim 1 wherein said SLACI pertains to group switching, said group switching involving coupling a plurality of UIDs that include said UID with a plurality of system devices that include said system device.

11. The computer-implemented method of claim 1 wherein said system device is a computer coupled to a computer network.

12. The computer-implemented method of claim 11 wherein said UID is a set of keyboard, mouse, and monitor.

13. The computer-implemented method of claim 1 wherein said SLACI is generated by human action that includes drag-and-drop using a computer pointing device.

14. The computer-implemented method of claim 1 wherein said SLACI is generated by human action that includes a hot-key combination.

15. The computer-implemented method of claim 1 wherein said SLACI is obtained via a browser.

16. The computer-implemented method of claim 1 wherein said SLACI is generated by human action that includes double-clicking on a computer mouse.

17. An arrangement for coupling a user interface device (UID) with a system device on a network, said UID and said system device being coupled with a set of heterogeneous user interface device (UID) switches, comprising:

a set of protocol modules associated with a said set of heterogeneous UID switches, individual one of said set of protocol modules including switch-specific information that is specific to respective one of said set of heterogeneous UID switches, wherein said set of protocol modules may include command structure for enabling data path management between said set of heterogeneous UID switches;

a hardware switch command server (SOS) managing requests for connectivity between said user interface device and said system device and establishing data path connectivity between said user interface device and said system device using at least one of said set of heterogeneous UID switches, wherein said hardware SCS performs said establishing data path connectivity automatically without intervention, said hardware switch command server being in electronic communication with said set of heterogeneous UID switches, wherein said hardware SOS is configured to generate responsive to a receipt of a switch/location agnostic connectivity indication (SLACI), a set of switch commands using switch-specific information associated with a first subset of UID switches located along an available data path between said UID and said system device, said hardware SCS is further configured to transmit said set of switch commands to said first subset of UID switches to cause said first subset of UID switches to create a complete data path between said system device and said UID, wherein said SLACI is generic with respect to switch-specific command syntax, said SLACI being received from a SLACI-origination device that is location agnostic with respect to said UID switch, said SLACI indicating at least an identity of said UID and an identity of said system device;

perform network discovery using said hardware SCS to manage said data path connectivity, said network discovery being performed automatically without human intervention, wherein said network discovery includes identifying at least internal backbone structures of said set of heterogeneous UID switches, hardware presence on said network, internal-external connections between said hardware and said set of heterogeneous UID switches, and current state of said internal-external connections;

wherein said hardware SCS is further configured to perform protocol negotiation automatically without requiring human intervention using said SLACI, to ascertain said available data path between said UID and said system device prior to said formulating said set of switch commands;

wherein said hardware SCS is further configured to perform network discovery automatically without requiring human intervention prior to said formulating to generate data pertaining to said UIDs, said set of heterogeneous UID switches, and said system devices that are available for interconnection using said hardware SCS.

18. The arrangement of claim 17, comprising a SLACI-originating device coupled with said hardware SCS for providing said SLACI to said hardware SCS.

19. The arrangement of claim 18 wherein said SLACI-originating device is a console that is different from said UID.

20. The arrangement of claim 18 wherein said SLACI-originating device is a logic circuit that automatically generates said SLACI responsive to a triggering condition.

21. The arrangement of claim 18 wherein said hardware SCS and said SLACI-originating device are coupled via the Internet.

22. The arrangement of claim 18 wherein said SLACI-originating device is said UID.

23. The arrangement of claim 17 wherein said SLACI pertains to group switching, said group switching involving coupling a plurality of UIDs that include said UID with a plurality of system devices that include said system device.

* * * * *